United States Patent [19]

Van Dongeren

[11] Patent Number: 4,566,704
[45] Date of Patent: Jan. 28, 1986

[54] SEALING BODY FOR A PIPE CONNECTION

[75] Inventor: Jan P. Van Dongeren, Bergentheim, Netherlands

[73] Assignee: Wavin, B.V., Zwolle, Netherlands

[21] Appl. No.: 712,650

[22] Filed: Mar. 18, 1985

Related U.S. Application Data

[62] Division of Ser. No. 570,695, Jan. 13, 1984, abandoned, which is a division of Ser. No. 398,234, Jul. 14, 1982, abandoned, which is a division of Ser. No. 133,792, Mar. 25, 1980, abandoned.

[30] Foreign Application Priority Data

Mar. 30, 1979 [NL] Netherlands ............... 7902516

[51] Int. Cl.$^4$ ............................................. F16L 11/08
[52] U.S. Cl. ........................ 277/207 A; 277/DIG. 2; 285/110
[58] Field of Search ............ 277/207, 207 A, DIG. 2; 385/110

[56] References Cited

U.S. PATENT DOCUMENTS

| 1,924,020 | 8/1933 | Binet | 277/207 A |
| 3,260,540 | 7/1966 | Nouot | 277/207 A |
| 4,361,336 | 11/1982 | Reeh et al. | 277/207 A |

FOREIGN PATENT DOCUMENTS

| 654454 | 10/1964 | Belgium | 277/207 A |
| 1443711 | 7/1976 | United Kingdom | 277/DIG. 2 |

Primary Examiner—Robert I. Smith
Attorney, Agent, or Firm—Wilkinson, Mawhinney & Theibault

[57] ABSTRACT

A sealing body for a pipe connection bonded chemically and/or mechanically to a fixation part being attachable to an end portion of a socket pipe. The fixation part consists of plastic material or of reticulated elastomer.

1 Claim, 9 Drawing Figures

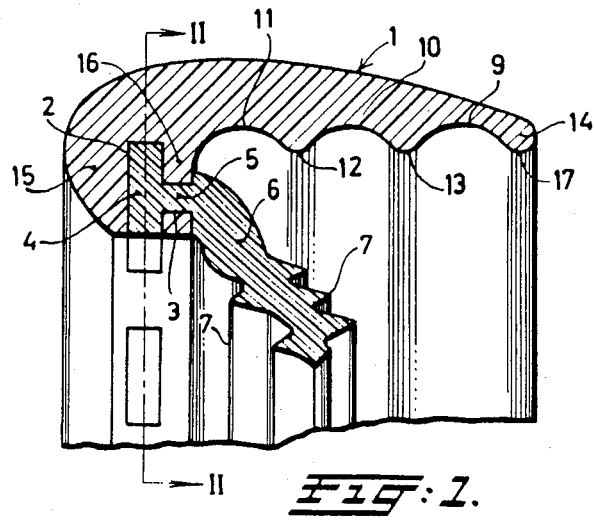
FIG: 1.
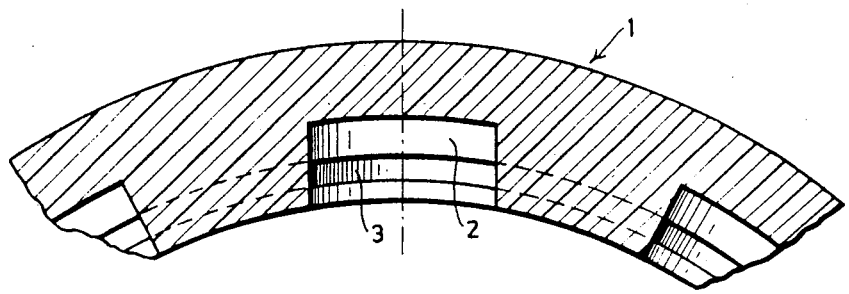
FIG: 2.
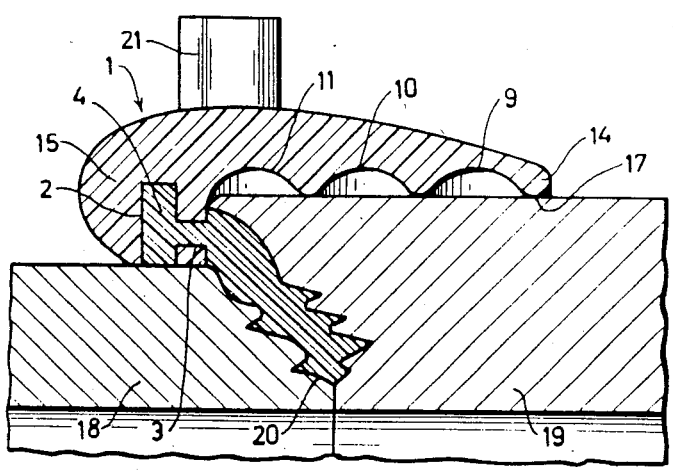
FIG: 3.

SEALING BODY FOR A PIPE CONNECTION

CROSS REFERENCE TO RELATED APPLICATIONS

This application is a division of application Ser. No. 570,695 filed Jan. 13, 1984 which is a division of application Ser. No. 398,234 filed July 14, 1982 which is a division of application Ser. No. 133,792 filed Mar. 25, 1980, all of which are now abandoned.

BACKGROUND OF THE INVENTION

1. Field of the Invention

The present invention relates to a sealing body for a pipe connection.

2. Description of the Prior Art

In the prior art sealing bodies for pipe connections have been used. Said prior art teaches sealing bodies consisting e.g. of a head part, being received in a chamber formed between the front side of a plastic pipe part and a retaining ring having a U- or J-shaped cross-section. By providing the inside of the retaining ring and the outside of the plastic pipe parts with wave-shaped elevations and recesses and by positioning the head part in such a way that it does not fill completely the chamber between the front side of the female plastic pipe and the retaining ring, the retaining ring is able to move longitudinally, if such a plastic pipe part hits the bottom. This constructions prevents damages to plastic pipe parts of said type, and in particular damages to the retaining ring. After a possible fall of the rubber material of the head part will push said retaining ring backward into its original position, owing to the resilient properties of said rubber material.

Such a plastic pipe part presenting very excellent properties, has the drawback of high manufacturing costs as both the retaining ring and the sealing body to be applied separately.

SUMMARY OF THE INVENTION

In view of the foregoing factors and conditions of the prior art it is a primary object of the present invention to provide a sealing body for a pipe connection which does not exhibit the abovementioned disadvantages, and which considerably reduces the expenditures for uniting a sealing body, a male pipe part and a retaining ring.

This is attained in accordance with the invention in that in a sealing body for a pipe connection the sealing body is intimately bonded in a chemical and/or mechanical manner, to a fixation part consisting of plastic or of reticulated elastomers and being fixable to an end portion of a pipe part.

It is another object of the present invention, due to chemically and/or mechanically bonding the sealing body to a fixation part being fixable to a pipe part, to have said fixation part together with the sealing body untimately bonded therewith, be attached to the female pipe part in one and the same action.

A great advantage of the present invention consists in that sealing bodies and fixation parts in the form of retaining rings as used up till now, need no longer be separately stored.

Another favorable effect consists in that the sealing body can never be mounted upon a female pipe part in a wrong manner, due to its bonding to the fixation part.

Said fixation part consists of a plastic or a crosslinked rubber, in order to provide said fixation part with the desired rigidity.

The sealing body and the fixation parts may be advantageously moulded from elastomers, the fixation part then consisting of a reticulated elastomer.

In an advantageous embodiment a sealing body according to the present invention is bonded to the fixation part by casting and molding, more particularly by injection molding.

Casting is to be understood here as the molding of a sealing body from a liquid mass which is cast into a mold, with an overpressure of at most 5 to 6 atm. A casting and molding of this type should not be confused with an injection molding, wherein very high pressures of e.g. 150 kg/cm2 are used.

The sealing body for a pipe connection advantageously consists of a head part and a sealing sleeve connected therewith which head part is received in one or more recesses in the fixation part.

In the latter event, the recess(es) is (are) preferably provided in the end portion of the fixation part, said fixation part efficiently consisting of a sleeve-shaped body, comprising an inwardly directed end edge. Said recess is then conveniently disposed in the inwardly directed end edge.

The wall thickness of the fixation part conveniently decreases toward an end, having the most remote position from the chamber between the front side of the female plastic pipe part and the retaining ring.

The relative fixation part advantageously consists of a plastic fixation part obtained by injection molding, which fixation part may be fixed to the outside of an endportion of a pipe part, more particularly to the outside of a socket of a pipe part.

In a preferred embodiment the fixation part consists of plastic, comprising a sleeve-shaped sealing body at its end. The plastic may be a thermoplastic, a thermosetting resin or a reticulated plastic.

The features of the present invention which are believed to be novel are set forth with particularity in the appended claims.

Other claims and many of the attendant advantages will be more readily appreciated as the same becomes better understood by reference to the following detailed description and considered in connection with the accompanying drawings in which like reference symbols designate like parts throughout the figures.

DESCRIPTION OF THE DRAWINGS

FIG. 1 is an embodiment of a sealing body in accordance with the invention, bonded to a rigid plastics fixation part;

FIG. 2 is a cross-section through a fixation part not comprising a sealing body;

FIG. 3 is a cross section of a fixation part and a mold to be applied for bonding a sealing body to said fixation part;

DESCRIPTION OF PREFERRED EMBODIMENTS

Figure 4:
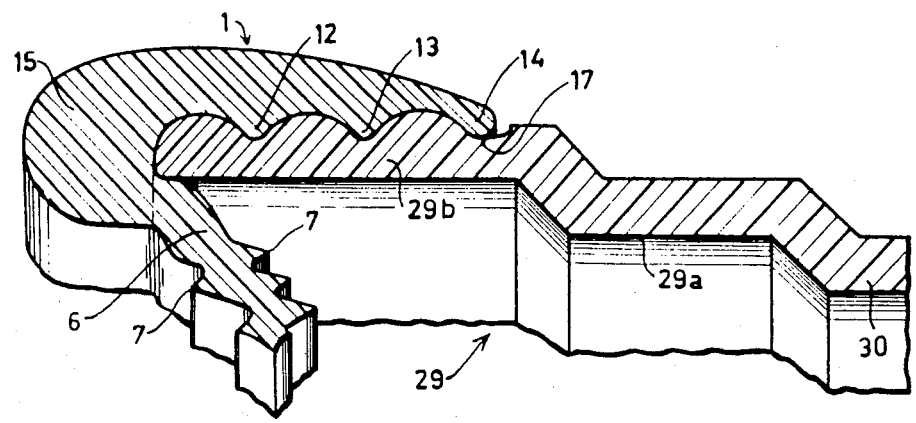
FIG. 4 is another embodiment of a sealing body bonded to a rigid plastic fixation part.

Initially referring to FIG. 1 an injection molded fixation part 1 is shown, consisting of polypropylene, the inside being provided during its manufacture with corrugated recesses 9, 10 and 11 and wave crests 12, 13, 17.

The extreme end 14 of the fixation part 1 is thinner than the remaining portion of the fixation part.

During injection molding of the fixation part, recesses 2 are simultaneously formed in said fixation part 1, said recesses being bounded by a front part 15 of the fixation part and an inward wall 16 bounding the chamber formed in the recess. Said wall 16 bounding the recesses comprises whether or not continuously annularly extending wall bores 3 (see FIG. 2).

Said fixation part is bonded to a sealing body, for example consisting of polyurethane rubber. Obviously other elastomeric materials may be used, provided that the sealing body may perform its sealing properties.

In order to bond the sealing body 6 to the fixation part 1, the inside of the fixation part is surrounded by two mold parts 18 and 19, which bound a mold space 20 for molding a sleeve-shaped sealing sleeve 6, the outside of which is provided with projections 7 improving the sealing action.

The space 20 is filled with a polyurethane compound at an overpressure of for instance 1 atm. Through the recess 3 in the chamber bounding wall 16 connection(s) 5 of elastomer material is or are molded simultaneously with the molding of the sleeve-shaped sealing sleeve 6. Said connection(s) 5 may be integral with a head part 4 of the sealing body 6. After filling the recesses 2 and the wall bores 3 in the chamber bounding wall 16, thus forming connection(s) 5 and entirely filling the mold space 20, the mold parts 18 and 19 are moved from one another after a sufficient setting of the polyurethane material, thereby providing a sealing body which is intimately bonded to a fixation part, in accordance with the present invention.

In order to ensure that the fixation part 1 will stay tightly pressed upon the mold parts 18 and 19 during the aforedescribed operation, it is recommended to fix the position of said fixation part by means of clamping members 21.

It will be obvious that a plurality of connections 5 will be molded in case of the presence of various wall bores 3 and that only one connection will be molded when one wall bore 3 is provided.

Referring now to FIG. 4 another embodiment of the present invention shows the fixation part 1 molded from a reticulated elastomer, for example a reticulated polyurethane, the sleeve-shaped sealing sleeve 6 consisting of a non-reticulated polyurethane material being cast directly to said fixation part 1. In this embodiment the fixation part 1 is attached to a socket 29 of a pipe part 30. Said socket comprises an outer widening 29b and an inner widening 29a for receiving the sleeve 6.

By applying measures known per se said fixation part and said sealing sleeve consisting of materials having different rigidities, may be produced in one step.

Figure 5:
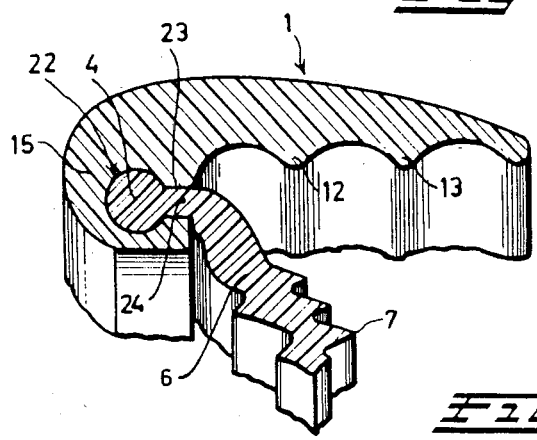
FIG. 5 is still another embodiment of a sealing body comprising a fixation part in accordance with the invention and FIGS. 6 to 9 show other embodiments of a sealing body bonded to a plastic fixation part in accordance with the invention.

Referring now to FIG. 5 yet another advantageous embodiment of the present invention comprises an annularly extending chamber 22, having a round cross-section. Fixation part 1 comprises an annularly extending wall bore 23, causing head part 24 of the sealing body to be united with a sleeve-shaped sealing sleeve 6 through an annular connecting part 24.

Figure 6:
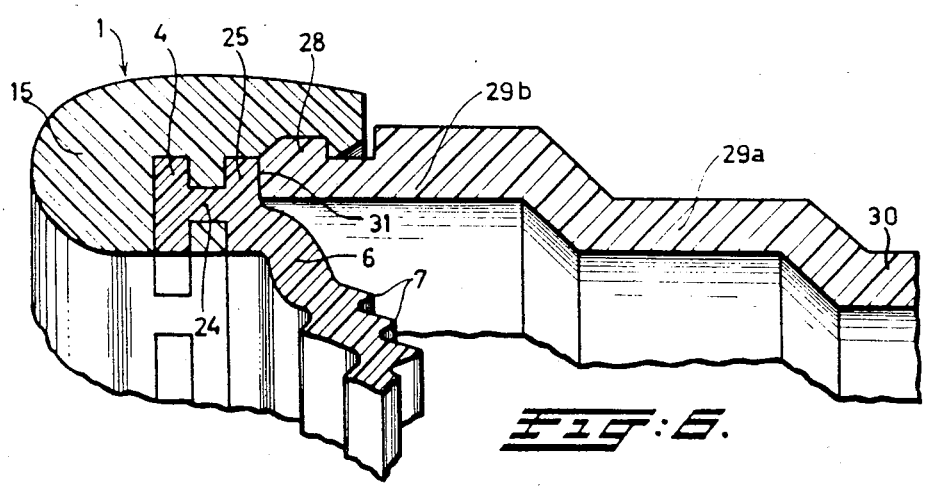

Referring now to FIG. 6 still another embodiment of the present invention is shown, wherein the inner side of the fixation part 1 comprises an additional annular elastomer body 25 adjacent to the head part 4 of the sealing body and whether or not annular connecting part 24, which additional elastomer body 25 is integral with the aforementioned sleeve-shaped sealing sleeve 6. In this case the fixation part 1 is provided with a recess which may snappingly engage a shoulder 28 of the socket 29. Said socket 29 comprises an outer widening 29b and an inner widening 29a for receiving said sealing sleeve 6.

Figure 7:
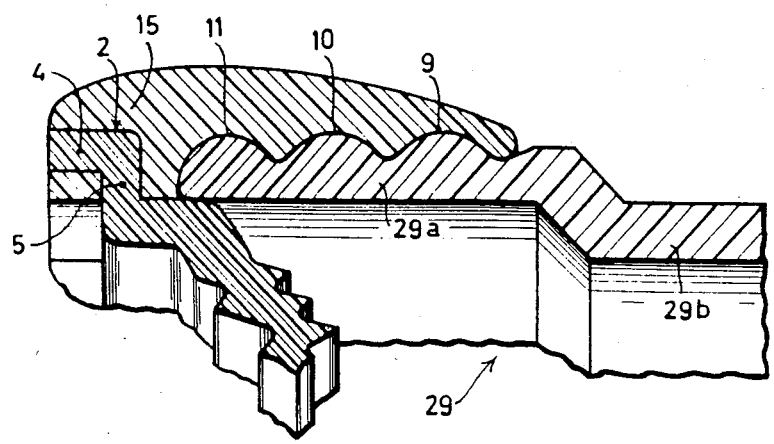

Referring now to FIG. 7, in which still another embodiment of the present invention is shown, head part 4 of the sealing body extends to the outside of the front part 15 of the fixation part. Said head part 4 is united with a sleeve-shaped sealing sleeve through the radial connection(s) 5.

Figure 8:
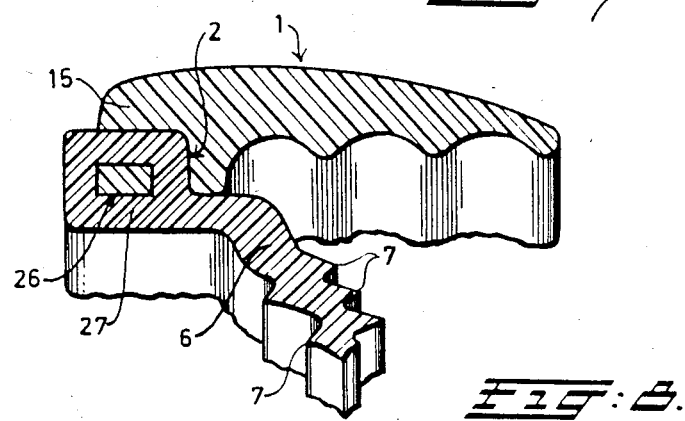

Referring now to FIG. 8 a further embodiment of the present invention is shown, wherein the sealing body extends beyond the outside of the front part 15 of the fixation part 1, the inside 26 of said fixation part 1 being covered with a layer of elastomeric material which layer 27 is integral with the sleeve-shaped sealing sleeve 6.

As shown in FIG. 4, the radius of curvature of the wave-shaped crests 12, 13, 17 of a fixation part 1 increases toward the free end or the thinnest portion 14 of said fixation part.

The wave-shaped recesses and crests enable the fixation part to move lontigudinally over the outside of the socket 29 in case the fixation part is subjected to impact loads.

Figure 9:
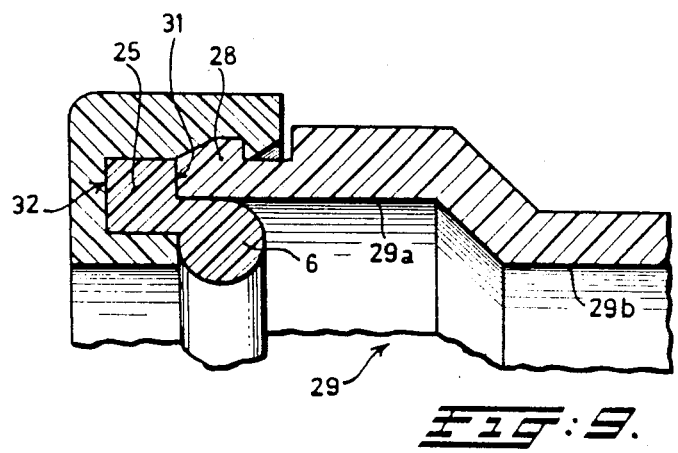

A part 25 of the sealing body may be accomodated in the space between the front wall 31 of the socket 29 and the opposite wall 32 of the fixation part 1 (see FIG. 9). In the latter case the shape of the sealing sleeve 6 is more like a circular ring having an annular cross-section.

What is claimed is:

1. A socket pipe part (29), the outer side of the socket snappingly engaging a retaining ring thus forming an outer annular groove chamber, a head portion (25) of a sealing sleeve (6) being retained in said groove chamber said head portion being chemically intimately bonded to the inner surface of said retaining ring so that no leakage will occur between the bottom (32) and the surface of head portion (25) engaging said bottom when liquid reaches the region between the front end (31) of said socket and part of the head portion opposite its free end.

* * * * *